UNITED STATES PATENT OFFICE.

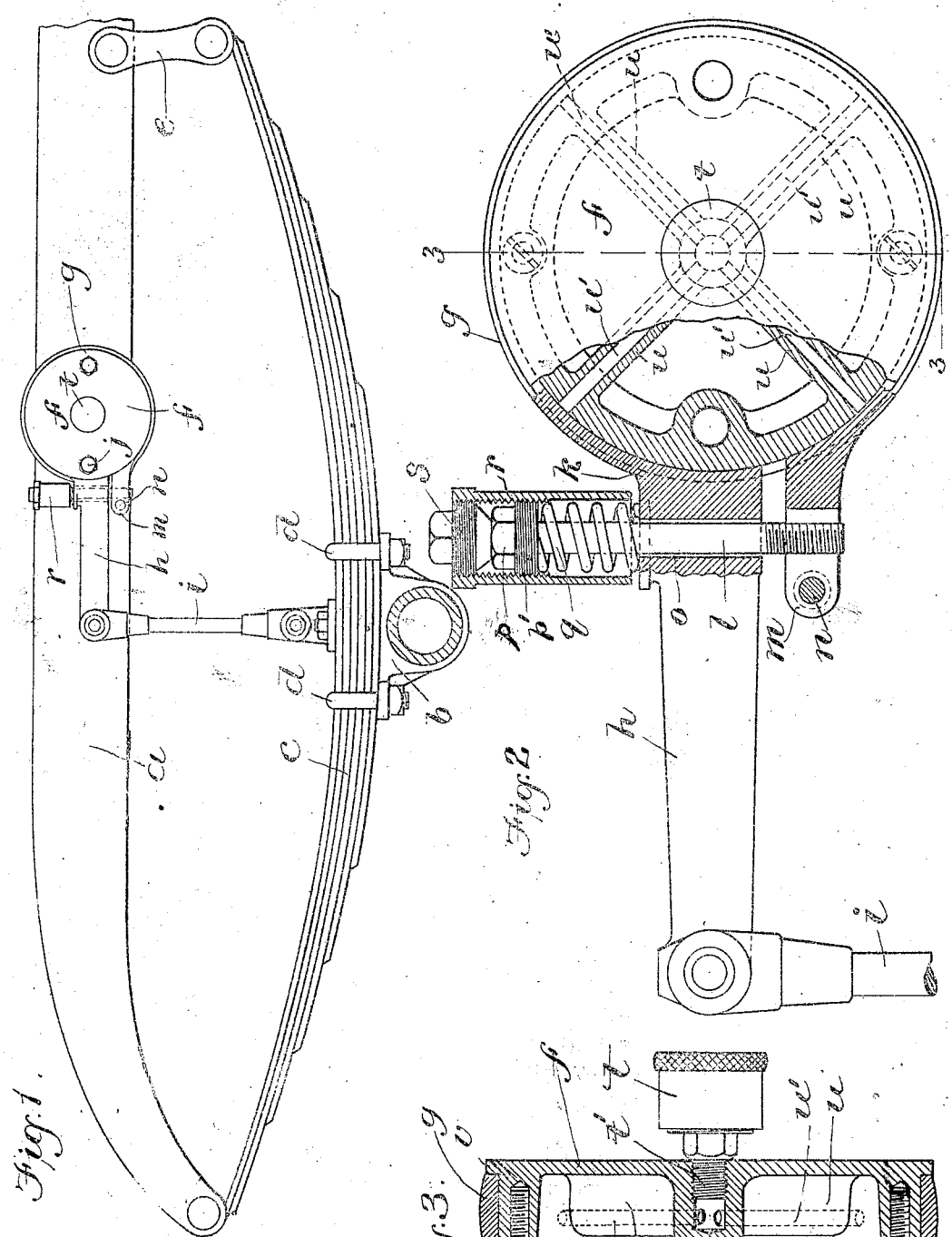

GEORGE S. HILL, OF BRADFORD, MASSACHUSETTS.

SHOCK-ABSORBING DEVICE.

No. 874,767.　　　Specification of Letters Patent.　　　Patented Dec. 24, 1907.

Application filed March 5, 1906. Serial No. 304,155.

*To all whom it may concern:*

Be it known that I, GEORGE S. HILL, of Bradford, in the county of Essex and State of Massachusetts, have invented certain new and useful Improvements in Shock-Absorbing Devices, of which the following is a specification.

This invention relates to appliances for vehicles to absorb and neutralize the effect of shocks produced by encountering obstacles. Its object is to provide a device adapted to be applied to vehicles of all sorts, which acts frictionally and is adapted to permit the springs of the vehicles to yield when an obstruction is encountered, but will check the movement which the springs, in recovering their normal condition, would tend to give to the vehicle body.

The invention consists in a drum and a relatively rotatable flexible strap therefor constituting frictional members, one of which is adapted to be attached to the vehicle body and the other to a truck, an axle, a wheel frame or other supporting base for the vehicle, and these members being adapted to diminish the power of their frictional engagement when moved in one direction and to increase the same when moved in the other.

An embodiment of the invention is illustrated in the accompanying drawings, wherein,—

Figure 1 represents a side view of such an embodiment applied to the vehicle. Fig. 2 represents a similar view partly in section and on an enlarged scale. Fig. 3 represents a cross section on the line 3—3 of Fig. 2.

Like references represent the same parts in all of the figures.

Referring to the drawings, the device embodying the present invention is shown as applied to an automobile, the letter *a* designating one of the side bars of the frame or chassis of the automobile.

*b* represents the box or bearing for one of the axles of the carriage, and *c* represents one of the springs which is attached to the bearing *b* by straps *d* and is pivotally connected to the bar *a* by a direct connection at one end and through a link *e* at the other.

The shock absorbing device consists of a drum *f*, about the periphery of which extends a strap *g*, to which strap is connected an arm *h* extending radially from the periphery of the drum and to the end of which is pivoted a link *i*. The drum is adapted to be connected to one of the relatively movable parts of the vehicle and an end of the link to be connected to another of such parts. In the arrangement shown, the drum is attached to the bar *a* forming part of the vehicle body by bolts *j*, while one end of the link *i* is pivoted to the central part of the spring where it is rigidly connected to the base or road support of the vehicle.

The strap *g* extends from the point *k* at which it is joined to the arm *h* about the greater portion of the periphery of the drum, and at its free end is slotted and tapped to receive a threaded bolt *l* which is adjustably screwed into the tapped space between the tongues *m* of the strap end and clamped in place by a screw *n* which may draw the tongues together. The bolt *l* extends through a hole *o* in the arm *h*, and, upon its outer end, has a head *p* serving as an abutment for a spring *q* which surrounds the bolt and bears at one end against the upper surface of arm *h*. Externally the bolt head has a threaded portion *p'* upon which is placed a sleeve *r* having an internal thread whereby it may be adjusted relatively to arm *h*. A lock nut *s* is screwed into the outer end of the sleeve *r* and bears against bolt head *p* so as to jam the threads of the sleeve tightly against those of the part *p'* and prevent the sleeve jarring loose.

It will be evident from the description above given, that the spring *q*, being under compression, presses against the abutment *p*, tending to draw the bolt through arm *h* and thereby bind the strap tightly about the periphery of the drum. By adjusting the threaded portion of the bolt in the end of the strap between the tongues *m*, the force with which the spring acts to tighten the band against the drum may be regulated. If a sudden impulse in an upward direction is applied to the end of the arm, the latter is raised against the spring *q* and compresses the same before the spring has had time to overcome the inertia of the bolt *l*, stop *r* and strap and accordingly the distance between the adjacent ends of the strap is increased and the latter is loosened about the drum; thereupon relative movement between the drum and arm or strap is permitted in one direction with but little or no frictional resistance from the strap. On the other hand, if the arm *h* is moved downward, the tendency is to bind the strap more tightly than usual upon the drum so that the frictional resistance to relative movement is much increased.

The value of these characteristics as applied to vehicles consists in the following: As the drum is connected to the vehicle body while the end of the arm is connected through link i with the rigid base of the vehicle, from which the body is kept separated by the springs, relative movement is produced whenever the wheels of the vehicle strike an obstruction. Whenever a wheel rises, the arm h is suddenly elevated while the inertia of the body holds the latter in substantially the same position, the springs however being distorted. This produces an upward movement of the arm about the drum to which there is opposed but little frictional resistance on account of the loosening of the strap. When, however, the springs becoming restored to their normal shape, overcome the inertia of the wagon body and cause the latter to rebound, the drum is elevated and a relative downward movement of the arm h is produced. This causes the strap to be tightened and the friction thereof to be increased and thus recovery of the springs is caused to take place much more slowly than their distortion. Accordingly there is very little tendency for oscillations to be set up and the wagon body is brought to a position of relative rest quickly and with complete absence of jouncing.

The tubular stop r is adjusted to limit the amount by which the spring q is compressed and so limit the amount of loosening of the strap. The adjustment is preferably made such as to allow sufficient loosening of the strap but not to permit so great loosening as to require any appreciable time to overcome it on the return motion of the arm.

In order to prevent the strap and drum from sticking together, I provide means for lubricating the same as shown in Figs. 2 and 3. This means consists of a cup t having a tubular stem t' threaded into a recess in the center of the drum. Arms u radiate from the center to the periphery of the drum and have channels u' opening into the central recesses. When lubricant is placed in the cup and crowded through the same, it is forced through the recesses and passages u' to the periphery of the disk. In order to retain the strap upon the drum, I provide an integral flange v adjacent with the face thereof and a detachable annulus w having a flange w' which is screwed upon the other face of the drum.

I have shown the strap g as extending almost around the entire circumference of the drum, but I do not desire to limit myself to such a construction, since a less length of strap may be provided. All that is necessary is that the strap should extend something more than one-half way round the drum. It is also not essential that the drum should be fastened to the wagon body and the arm h linked to the rigid support, since this arrangement can be reversed without altering the principle of the invention or manner of operation.

What I claim is,—

1. A shock absorber for vehicles, comprising a drum and a band engaging the same, constituting coöperating frictional members, one of which is attached to the spring supported body of the vehicle and the other to the supporting base, said members being constructed and arranged to loosen the band when the body and base approach each other and to tighten the band when they separate, and adjustable means for limiting the loosening movement of said band.

2. A shock absorber for vehicles, comprising a drum, a strap frictionally engaging the periphery of the drum, the drum and strap being attached respectively to different relatively movable parts of a vehicle, and arranged so that relative movement of said parts in one direction may loosen the strap and in the other may tighten the strap, to check such motion, and adjustable means for limiting the loosening movement of said strap.

3. A shock absorber for vehicles, comprising a drum, a strap frictionally engaging the periphery of the drum, the drum and strap being attached respectively to different relatively movable parts of a vehicle, and being rotatable to each other when movement between said parts occurs, being also constructed so that relative movement of said parts in one direction may loosen the strap and in the other may tighten the strap, to check such motion, and adjustable means for limiting the loosening movement of said strap.

4. A shock absorber for vehicles, comprising a drum, a flexible strap, yielding means tending to hold said strap in frictional engagement with the drum, the latter being mounted on one of the relatively movable parts of the vehicle, and means on another of such parts connected to the strap, arranged to loosen the same against the tension of the yielding means when movement between the parts in one direction occurs, and to permit tightening of the strap during movement in the opposite direction to check such movement, and adjustable means for limiting the loosening movement of said band.

5. A shock absorber for vehicles, comprising a drum, a flexible strap, yielding means tending to hold said strap in frictional engagement with the drum, the latter being mounted on one of the relatively movable parts of the vehicle; means on another of such parts connected to the strap, arranged to loosen the same against the tension of the yielding means when movement between the parts in one direction occurs, and to permit tightening of the strap during movement in the opposite direction to check such movement; and a stop limiting the movement of the yielding means.

6. A shock absorber, comprising a drum, a strap engaging the periphery thereof, an arm secured to the strap, and yielding means holding the strap against the drum, the arm and drum being relatively rotatable and arranged, when moved in one direction, to overcome said yielding means and loosen the strap, and, when moved in the other direction, to release the yielding means and allow the strap to tighten, whereby the frictional resistance to said movements is varied, and a stop for limiting the loosening movement of said strap.

7. A shock absorber, comprising a drum, a rigid arm, a strap connected thereto and engaging the periphery of the drum, and a spring engaging the arm and strap, tending to bind the latter about the drum, and arranged so that its tension is overcome and the strap loosened when the arm is moved in one direction about the drum, and adjustable means for limiting the loosening movement of said strap.

8. A shock absorber, comprising a drum, a rigid arm, a strap connected thereto and engaging the periphery of the drum, and a spring connected to the arm and strap end, tending to draw them together to bind the strap about the drum, said spring being adapted to yield and loosen the strap when the arm is moved suddenly in one direction about the drum, and an adjustable stop adapted to limit the yielding movement of said spring.

9. A shock absorber, comprising a drum, a rigid arm, a strap connected thereto and engaging the periphery of the drum; a spring connected to the arm and strap end, tending to draw them together to bind the strap about the drum, said spring being adapted to yield and loosen the strap when the arm is moved suddenly in one direction about the drum; and a stop connected to the strap end in the path of the arm limiting the capacity for yielding of the spring.

10. A shock absorber, comprising a drum, a strap surrounding a portion of the periphery of the drum, and means within the circumference of the drum for containing and forcing lubricant to the periphery thereof.

11. A shock absorber comprising a drum, an arm, a strap connected thereto and engaging the periphery of the drum, a spring engaging the arm and the strap and arranged so that its tension is overcome and the strap loosened when the arm is moved in one direction about the drum, and an adjustable stop surrounding said spring adapted to limit the loosening movement of said strap.

12. A shock absorber comprising a drum, an arm provided with an opening, a bolt adapted to be passed through said opening, a strap engaging the periphery of the drum and having one of its ends connected to said arm and its other end connected to the lower portion of said bolt, a spring coiled around the upper part of said bolt and bearing against said arm, and a tubular stop adjustably mounted on said bolt and adapted to limit the strap-loosening movement of said arm.

In testimony whereof I have affixed my signature, in presence of two witnesses.

GEORGE S. HILL.

Witnesses:
A C. RATIGAN,
ARTHUR H. BROWN